B. EDGAR.
EAR MUFFLERS.

No. 184,006. Patented Nov. 7, 1876.

UNITED STATES PATENT OFFICE.

BUTLER EDGAR, OF ESPY, PENNSYLVANIA.

IMPROVEMENT IN EAR-MUFFLERS.

Specification forming part of Letters Patent No. 184,006, dated November 7, 1876; application filed March 13, 1876.

*To all whom it may concern:*

Be it known that I, BUTLER EDGAR, of Espy, in the county of Columbia and State of Pennsylvania, have invented certain new and useful Improvements in Ear-Mufflers; and I do hereby declare that the following is a full, clear, and exact description thereof, which will enable others skilled in the art to which it appertains to make and use the same.

The object of my invention is to protect the ears from the excessive cold of northern latitudes by a muffler simple in construction and easily adapted to the head or neck, and so constructed that when not in use it can be easily folded up and carried in the pocket.

This invention consists of a frame of wire or other elastic material, either end of which is bent into an irregular circle of such form and size as easily to fit the ear, and covered with fur or cloth. These frames are united by a wire passing behind the neck; and on either side, at a short distance back of the pads or frame-covers, is a common tenon-and-socket hinge, to facilitate folding the muffler, as will more fully appear by reference to the accompanying drawings.

Figure 1:
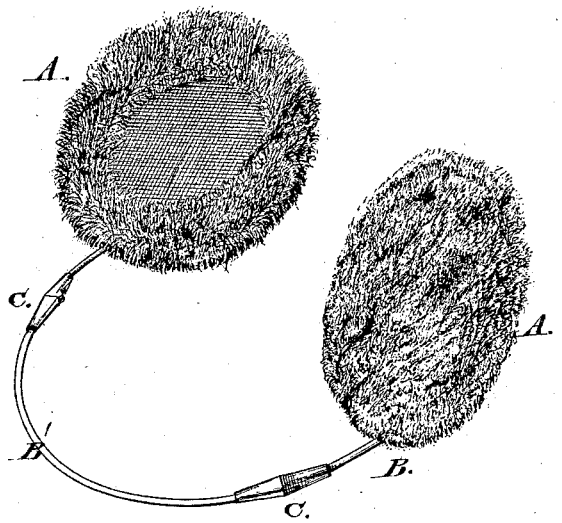
Figure 2:
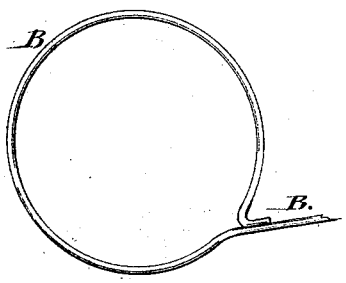
Figure 3:
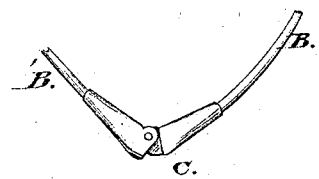

Figure 1 shows the muffler as a whole—the ear-pads A A inside and outside, the extension of the frame B' B', and hinges C C. Figs. 2 and 3 are details of Fig. 1, showing the frames B B and hinges C C.

B B, Fig. 2, are metallic frames, made of wire or any cheap elastic metal, constructed by bending the front ends into the form of irregular circles, of which the vertical diameters are somewhat longer than the transverse diameters. These frames are of sufficient size to cover the ears when padded. B' B', Fig. 1, are extensions of the frames B B, passing behind the neck, and curved to conform to its shape. C C, Figs. 1 and 3, are common tenon-and-socket hinges, made of the same material as the frames B B', located a short distance back of the ear-pads, and designed and so constructed as to fold the muffler, when not in use, into the smallest convenient compass. A A, Fig. 1, are pads, fastened to the frames B B as supports, and from which they take their shape, made of fur or cloth, of such size as may be required to cover and protect the ears from injury by freezing.

I claim—

The ear-muffler A A, having the frames B B' and hinges C C, combined and arranged substantially as and for the purpose set forth.

BUTLER EDGAR.

Witnesses:
ISAAC MCKAMEY,
M. C. MCCOLLUM.